United States Patent
Pollock (10) Patent No.: US 11,433,963 B2
(45) Date of Patent: Sep. 6, 2022

(54) SEATPOST ASSEMBLY HAVING A REVERSIBLE SADDLE CLAMP

(71) Applicant: Fox Factory, Inc., Duluth, GA (US)

(72) Inventor: Thomas Pollock, Fletcher, NC (US)

(73) Assignee: Fox Factory, Inc., Duluth, GA (US)

( * ) Notice: Subject to any disclaimer, the term of this patent is extended or adjusted under 35 U.S.C. 154(b) by 135 days.

(21) Appl. No.: 16/848,083

(22) Filed: Apr. 14, 2020

(65) Prior Publication Data

US 2020/0324841 A1 Oct. 15, 2020

Related U.S. Application Data

(60) Provisional application No. 62/833,962, filed on Apr. 15, 2019.

(51) Int. Cl.
*B62J 1/08* (2006.01)
*B62J 1/00* (2006.01)

(52) U.S. Cl.
CPC .................. *B62J 1/08* (2013.01); *B62J 1/002* (2013.01); *B62J 2001/085* (2013.01)

(58) Field of Classification Search
CPC .............................. B62J 1/08; B62J 2001/085
See application file for complete search history.

(56) References Cited

U.S. PATENT DOCUMENTS

| | | | |
|---|---|---|---|
| 2012/0181824 A1* | 7/2012 | Hsu ........................... | B62J 1/08 297/215.15 |
| 2020/0247492 A1* | 8/2020 | Coaplen ..................... | B62J 1/08 |
| 2021/0094642 A1* | 4/2021 | Dubois ....................... | B62J 1/08 |
| 2021/0206443 A1* | 7/2021 | Sakagawa .................. | B62J 1/08 |

* cited by examiner

*Primary Examiner* — Timothy J Brindley

(57) ABSTRACT

A seatpost assembly is disclosed. The assembly includes a housing fixedly coupled to a seatpost, the housing including at least one adjustable clamp assembly retaining member. The assembly also includes a reversable saddle rail clamp assembly, the reversable saddle rail clamping assembly having a bottom saddle rail clamping member and a top saddle rail clamping member. The top saddle rail clamping member is configured to be coupled with the bottom saddle rail clamping member in a first orientation to provide a first offset position, and further configured to be coupled with the bottom saddle rail clamping member in a second orientation to provide a second offset position different from said first offset position.

17 Claims, 8 Drawing Sheets

SEATPOST ASSEMBLY HAVING A REVERSIBLE SADDLE CLAMP

CROSS-REFERENCE TO RELATED APPLICATIONS (PROVISIONAL)

This application claims priority to and benefit of U.S. Provisional Patent Application No. 62/833,962 filed on Apr. 15, 2019, entitled "A Seatpost Assembly Having A Reversible Saddle Clamp" by Thomas Pollock, assigned to the assignee of the present application, the disclosure of which is hereby incorporated by reference in its entirety.

FIELD OF THE INVENTION

Embodiments of the invention generally relate to a seatpost assembly with reversable saddle clamp that can modify a location and an orientation of a saddle coupled thereto.

BACKGROUND

Saddle geometry is an important part of a vehicle (such as a bicycle, unicycle, tricycle, and the like) setup. If the saddle is too far forward, a rider sitting on the saddle will feel crowded, or unstable. Similarly, if the saddle is too far back, the rider on the saddle would feel uncomfortable based on the reach requirement. Moreover, if the saddle is pitched too far forward (or too far backward) it will cause undue discomfort for the rider. Additionally, what would be considered a good set-up for one rider would likely feel uncomfortable for another rider. Similarly, what would feel like a good saddle orientation on a bike being used in offroad conditions can be different than a good saddle orientation on the same bike being used on the road. As such, there are no universal saddle geometry settings, instead the saddle settings are user specific and can change for the same bike depending on the terrain being traversed. Thus, different riders and terrain can require any number of different seatpost head assemblies.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Overview

Developing a seatpost and saddle clamp assembly that provides independent pitch and fore-and-aft movement is a continuous challenge. Moreover, as is often the case in development and experimentation that come with advancing technologies, when a solution is found or an advancement is made in one area of a system, it often incurs a penalty or compromise in another different part of the system. As such, seatpost and saddle clamp assembly builders and users are constantly inventing, experimenting, developing, and tuning the seatpost and saddle assemblies for different performance requirements, changes in manufacturing methods, the availability and use of different materials, structural improvements, weight reductions, usability, durability, and the like.

In one embodiment, a seatpost and saddle clamp assembly allows adjustments to offset and pitch are made about nominal values which are part of the seatpost design. The adjustments can be for personal preferences, different bike geometries, different user geometries, different terrain, different performance characteristics, and the like. For example, a tall rider would likely prefer a saddle offset further aft than a shorter rider on the same bike. In contrast, a rider would likely prefer a first saddle offset distance when riding a bike on a road and a second saddle offset distance (different than the first saddle offset distance) when riding the same bike on a BMX track, a gravel road, down a hillside, etc.

The following discussion provides a novel solution for a seatpost and saddle clamp assembly (e.g., saddle clamp system 100) that includes the ability to allow an offset adjustment of a saddle's nominal offset value with respect to the location of the vehicle seat tube.

In one embodiment, the seatpost clamps and head design allows reversible saddle clamps to change the nominal offset between the saddle clamp center and the seatpost centerline. This yields at least two nominal saddle offset positions for a single parts set, and increases the fitment options for a single assembly. In one embodiment, the saddle clamp interface with the seatpost is not centered with respect to the saddle clamp interface with the saddle rails. Thus, embodiments of the reversible saddle clamp configuration described herein are able to obtain previously unavailable configurations such as, but not limited to, a positive offset and zero offset configuration, a two different non-zero positive offset configuration, a negative offset and zero offset configuration, a two different negative offset configuration, a positive offset and negative offset configuration, and the like.

For purposes of clarity, the technology is described in embodiments of a bicycle. Although, the bicycle is provided as one embodiment, it is appreciated that the technology could be similarly installed and applicable on a number of different bicycle styles such as a road bike, a mountain bike, a gravel bike, a BMX bike, or the like that have more, less, or different components that those shown in FIG. 1A. It is further appreciated that the technology could be similarly installed and applicable on a number of different vehicles types such as an e-bike, a BMX bike, a unicycle, a moped, and the like.

Operation

Figure 1A:
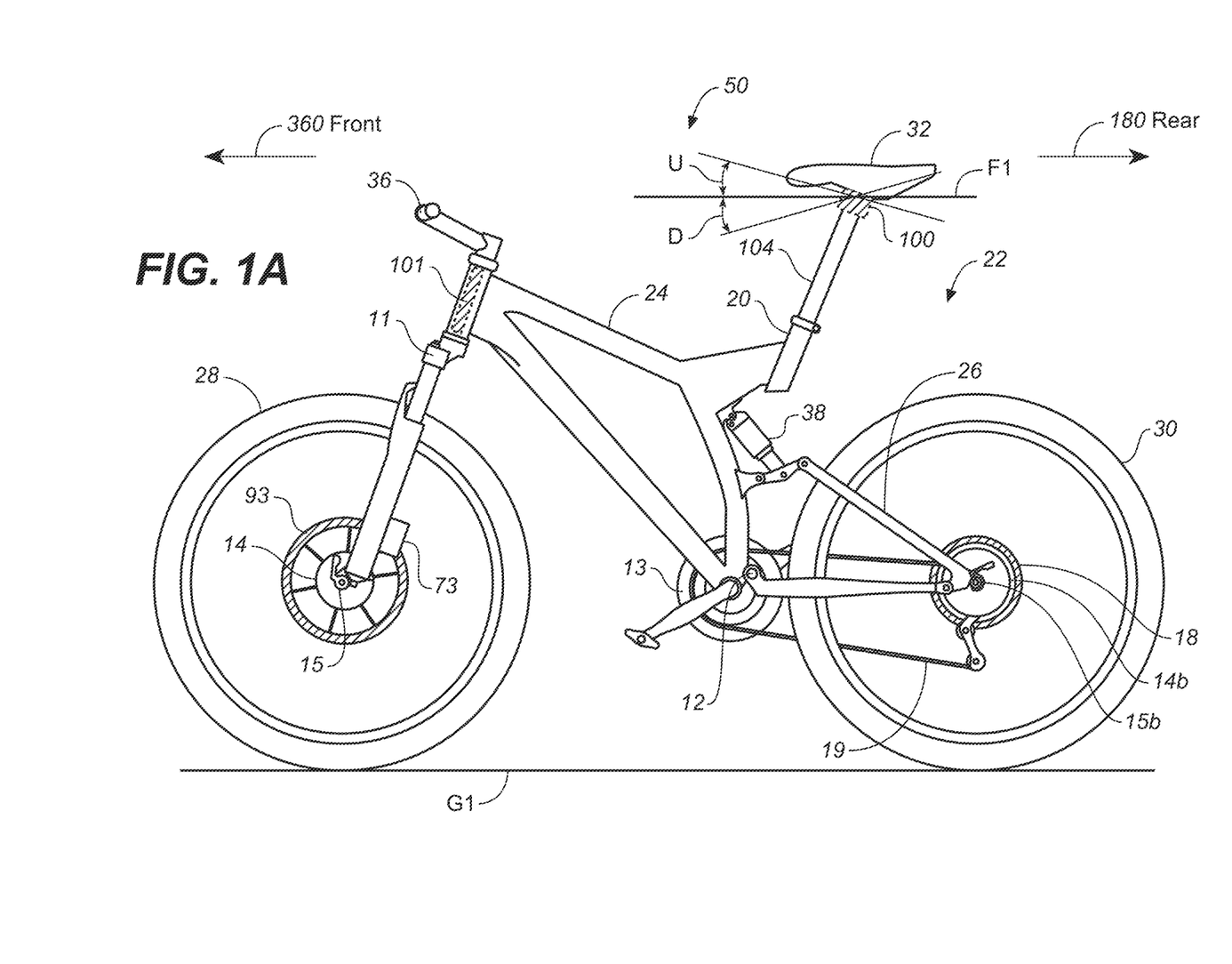
FIG. 1A is a perspective view of a bicycle upon which the saddle and seatpost assembly is mounted, in accordance with an embodiment.

Referring now to FIG. 1A, a perspective view of a bicycle 50 including a saddle clamp system 100 is shown in accordance with an embodiment. FIG. 1A also includes a front direction 360 (as indicated by the arrow and in the general direction of the handlebars and the front wheel) and a rear direction 180 (as indicated by the arrow and in the general direction of the rear wheel). For purposes of the following discussion, movement of a component or assembly of bicycle 50 in a fore or forward direction is movement toward front direction 360, while movement of a component or assembly of bicycle 50 in an aft or rearward direction is movement toward rear direction 180.

Bicycle 50 includes handlebar assembly 36, a saddle 32, a frame 22, a front fork assembly 11, a front wheel assembly 28, and a rear wheel assembly 30.

In one embodiment, frame 22 is a sectional frame consisting of a main frame portion 24 and a swing arm portion 26. In one embodiment, swing arm portion 26 is coupled to the main frame 24 via a pivot point 12 and a rear shock 38 to provide a rear suspension. In one embodiment, frame 22 is a single piece that has a geometry to include aspects of main frame 24 and swing arm portion 26. In one embodiment, single piece frame 22 is manufacture as a single component to form a rigid frame 22 (e.g., a hard tail).

In one embodiment, bicycle 50 is a full suspension bicycle. For example, in one embodiment, the front fork assembly 11 includes a damper in at least one fork leg to provide a front suspension that is used in conjunction with the rear-suspension discussion above. In another embodiment, bicycle 50 has only a front suspension and no rear suspension (e.g., a hard tail). In yet another embodiment, bicycle 50 could be rigid; that is, bicycle 50 would have no front or rear suspension.

In different embodiments, instead of being used on bicycle 50 saddle clamp system 100 could be used in other vehicles such as, a road bike, a mountain bike, a gravel bike, an e-bike, a BMX bike, a unicycle, or the like.

In one embodiment, front wheel assembly 28 includes a tire on a rim that is fixedly coupled via a series of spokes (or the like) to a wheel hub 14. Wheel hub 14 is located in the center of front wheel assembly 28 and has an axial opening in a center thereof. In one embodiment, axle 15 is inserted through the axial opening of wheel hub 14 and removably coupled to the fork assembly 11. In so doing, front wheel assembly 28 is retained with respect to the fork assembly 11 while remaining rotatable about axle 15.

In one embodiment, bicycle 50 includes a disk brake assembly having at least one rotor 93 attached to wheel hub 14 and at least one caliper 73 attached to fork assembly 11. In one embodiment, fork assembly 11 includes a steerer tube 101 which is inserted through a head tube of main frame 24 to couple fork assembly 11 with a handlebar assembly 36.

In one embodiment, rear wheel assembly 30 includes a tire on a rim that is fixedly coupled via a series of spokes (or the like) to a wheel hub 14b. Wheel hub 14b is located in the center of rear wheel assembly 30 and has an axial opening in a center thereof. In one embodiment, axle 15b is inserted through the axial opening of wheel hub 14b and removably coupled to swing arm portion 26. In so doing, rear wheel assembly 30 is coupled with swing arm portion 26 while remaining rotatable about axle 15b.

In one embodiment, bicycle 50 has a drive train that consists of a front sprocket assembly 13 (including at least one sprocket), at least one rear sprocket 18, and a chain 19. In one embodiment, the at least one rear sprocket 18 is coupled with wheel hub 14b, the front sprocket assembly 13 is mounted on main frame 24, and chain 19 is used to transfer power from the front sprocket assembly 13 to the rear sprocket 18. Although a chain is used in one embodiment, it is appreciated that the power transfer could be performed by a belt, a shaft, a rod, or the like.

In one embodiment, such as in the case of motorized and e-bikes, the power could be provided to the rear sprocket 18 from a location other than the front sprocket assembly. In one embodiment, of a motorized and e-bike setup, the front sprocket assembly could remain and also be used to provide some, none, or all of the power to rear sprocket 18. In one embodiment, of a motorized and e-bike setup, the front sprocket assembly is removed, and the motor will provide all of the power to rear sprocket 18.

In one embodiment, bicycle 50 includes a seat tube 20, a seatpost 104 and saddle clamp system 100. In one embodiment, seat tube 20 is an opening in a portion of the frame 22 designed to receive and retain seatpost 104. In one embodiment, seat tube 20 has a designed depth, and seatpost 104 is adjustably insertable into seat tube 20 across a range between the minimum required insertion depth for the seatpost 104 and the maximum designed depth of seat tube 20. In one embodiment, seatpost 104 is a fixed length rigid seatpost. In another embodiment, seatpost 104 is a dropper seat post.

Saddle Set-Up

A seatpost 104 and/or a saddle 32 attached thereto is adjustable in height, offset, and pitch. In one embodiment, saddle height is a measured distance between a top of saddle 32 and a reference point such as the ground G1, a point on the frame 22, the cranks, or the like. As such, an adjustment to the saddle height would either increase the distance between saddle 32 and the reference point (e.g., raising the saddle height) or decrease the distance between the saddle 32 and the reference point (e.g., lowering the saddle height). The saddle height is usually adjusted by changing the amount of seatpost 104 into or out of seat tube 20. If a major height change is needed, a different length seatpost 104 would also work.

In general, offset refers to the horizontal difference between the center of the clamps retaining saddle 32 and a central axis of the seat tube 20. Thus, a neutral offset would mean that the center of the clamps retaining saddle 32 would be in the same horizontal plane as the central axis of the seat tube 20. In one embodiment, the initial offset of saddle 32 is a nominal value which is part of the seatpost design.

For purposes of clarity in the discussion, offset adjustment will refer to a forward or aft movement of saddle 32 from its initial location as shown in FIG. 1A. As such, a forward offset movement of saddle 32 would move saddle 32 into a new position somewhat in front 360 of its previous location. Conversely, an aft movement of saddle 32 would move saddle 32 into a new position somewhat to the rear 180 of its previous location.

In one embodiment, as described herein, by utilizing the offset adjustment capabilities of saddle clamp system 100 the fore-and-aft movement of saddle 32 does not necessarily modify a pitch of the saddle. In other words, an offset adjustment to the saddle 32 will move the saddle 32 fore-and-aft along a plane F1 generally parallel to the bicycle frame 22. As such, a forward offset adjustment would move the saddle toward the front 360 of the bicycle along plane F1 but it would not necessarily adjust the pitch of saddle 32. In contrast, a rear offset adjustment would move the saddle toward the rear 180 of the bicycle along plane F1 and it would also not necessarily adjust the pitch of saddle 32.

In general, saddle 32 has a front end (or nose) and a back end. Moreover, the nose of saddle 32 faces toward the front 360 of bicycle 50. In one embodiment, a rotational point of saddle clamp system 100 is somewhere between the nose and the rear of saddle 32. The pitch of saddle 32 refers to an angle formed between horizontal plane F1 and a plane that passes through the nose and out the back of saddle 32 (e.g., a saddle plane). For example, if the saddle is mounted to the seatpost head with a zero degree pitch, the saddle plane will be approximate parallel to horizontal plane F1.

In order to change the pitch of saddle 32, the nose and rear of saddle 32 will need to pivot about the rotational point of saddle clamp system 100. As such, raising the nose of saddle 32 would lower the rear, and conversely lowering the nose of saddle 32 would raise the rear.

When the pitch is adjusted, the new orientation of the saddle plane is no longer parallel to horizontal plane F1. This change in orientation introduces an angle between the saddle plane and the horizontal plane, e.g., a nose angle.

For example, an upward pitch adjustment to saddle 32 would cause saddle 32 to pivot about the rotational point of saddle clamp system 100 such that the front of saddle 32 would now be higher (e.g., further from the ground plane G1) while the rear of saddle 32 would be lower (e.g., closer to the ground plane G1). In an upward pitch, the saddle plane would no longer be parallel with horizontal plane F1. Instead, the saddle plane would intersect horizontal plane F1 at the rotational point of saddle clamp system 100. Thus, adjusting the pitch upward results in saddle 32 having a pitch of measurement nose angle U.

In contrast, a downward pitch adjustment to saddle 32 would cause saddle 32 to pivot about the rotational point of saddle clamp system 100 such that the front of saddle 32 would now be lower (e.g., closer to the ground plane G1) while the rear of saddle 32 would be higher (e.g., further from the ground plane G1). In a downward pitch, the saddle plane would no longer be parallel with the horizontal plane F1. Once again, the saddle plane would intersect horizontal plane F1 at the rotational point of saddle clamp system 100. Thus, adjusting the pitch downward results in saddle 32 having a pitch of measurement nose angle D.

In one embodiment, the pitch angle of saddle 32 can be adjusted to any number of different angles, any number of different times. In one embodiment, the configuration of saddle clamp system 100 is such that a pitch adjustment of saddle 32 does not necessarily modify the offset of saddle 32.

Figure 1B:
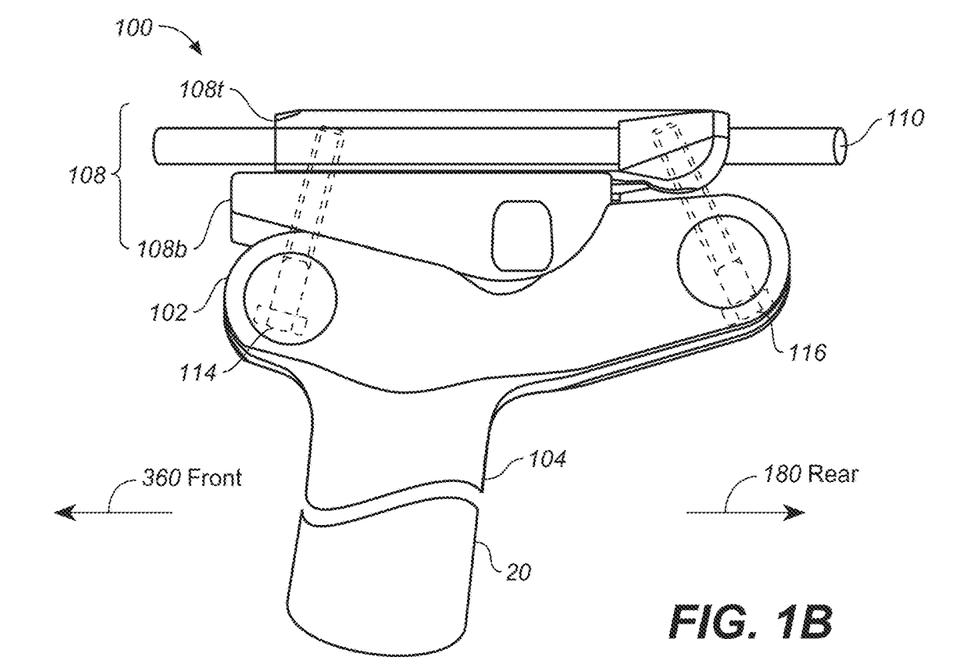
FIG. 1B is a perspective view of an exemplary system for coupling the saddle to a seatpost assembly, in accordance with an embodiment.

Referring now to FIG. 1B, an embodiment of the saddle clamp system 100 for coupling and adjusting a position and orientation of saddle 32 to a vehicle is shown. The saddle clamp system 100 includes a housing 102 and a seatpost 104. In one embodiment, housing 102 and seatpost 104 are fixedly coupled. In one embodiment, housing 102 and seatpost 104 are formed as a single piece during manufacture. In one embodiment, housing 102 and seatpost 104 are cast as a single piece during manufacture. As described herein, in one embodiment, seatpost 104 is designed to slide into seat tube 20.

Figure 1C:
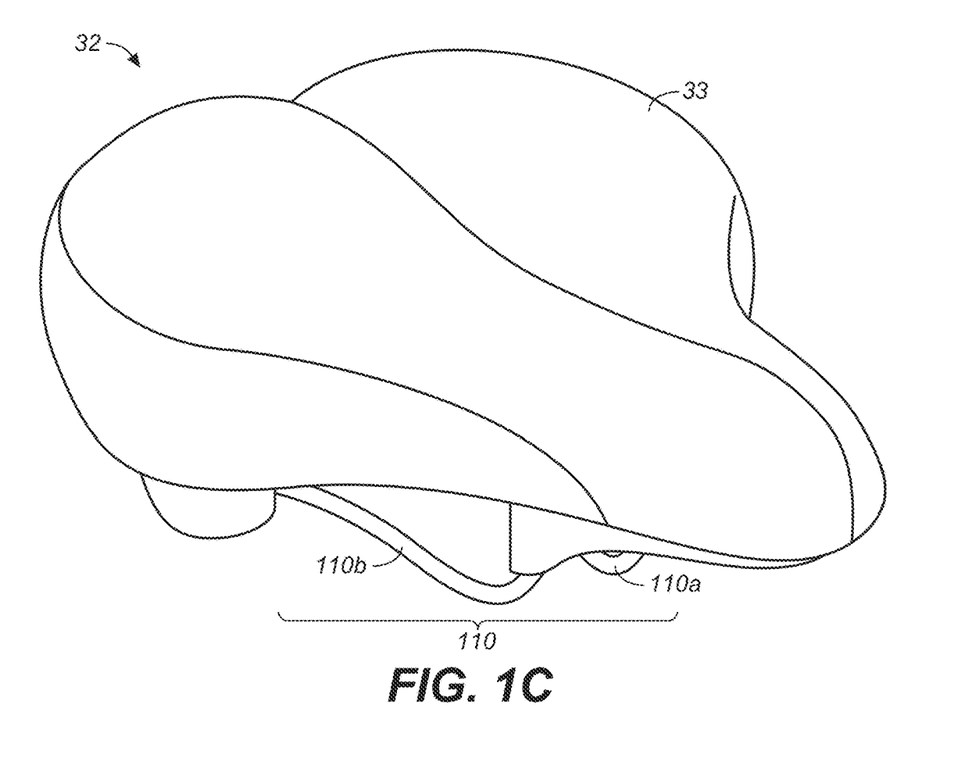
FIG. 1C is a perspective view of a saddle, in accordance with an embodiment.

With reference now to FIG. 1C, an exemplary saddle 32 including a top surface 33, and a first rail 110a and a second rail 110b (collectively rails 110) is shown in accordance with an embodiment. Although a certain surface 33 design is shown, it is exemplary. The surface 33 could be of any shape, thickness, pattern, or the like. Moreover, although round rails 110 are shown in one embodiment. It is appreciated that in another embodiment, the rails 110 could be of any geometric shape, thickness, or number. Moreover, one embodiment could use a single piece divided rail, or a number of rail 110 configurations to mount saddle 32 upon saddle clamp system 100 described herein. The use of two rails 110 is one embodiment and is provided for purposes of clarity.

Referring again to FIG. 1B and now in conjunction with FIG. 1C, saddle clamp system 100 further includes, a bottom saddle rail clamping member 108b and a top saddle rail clamping member 108t (collectively saddle rail clamping members 108). The saddle rail clamping members 108 are used to clamp down on rails 110 to hold the saddle in a desired offset location.

In one embodiment, saddle clamp system 100 includes a first clamp retaining member 114 and a second clamp retaining member 116. In general, first clamp retaining member 114 and second clamp retaining member 116 are used to tighten the saddle rail clamping members 108 to hold the saddle 32 in a fixed fore-aft position.

In addition, first clamp retaining member 114 and second clamp retaining member 116 can be adjusted to establish a desired saddle pitch. In FIG. 1B, front direction 360 and a rear direction 180 are shown. It should be appreciated that these two general direction are provided in conjunction with FIG. 1A for purposes of clarity. In one embodiment, the front and rear directions could be reversed to show the different orientations for saddle clamp system 100.

In one embodiment, the loosening of first clamp retaining member 114 and the subsequent tightening of second clamp retaining member 116 will cause the saddle to be pitched upward relative to the front 360 of the vehicle to which the seatpost 104 is attached. Similarly, the loosening of second clamp retaining member 116 and the subsequent tightening of first clamp retaining member 114 will cause the saddle to be pitched downward relative to the front 360 of the vehicle to which the seatpost 104 is attached.

Thus, the saddle clamp system 100 enables independent positioning of a pitch angle of the saddle 32 (e.g., nose up, level with ground, nose down, etc.). Similarly, the offset location of the saddle can be adjusted prior to tightening down the first clamp retaining member 114 and the second clamp retaining member 116 to establish the desired offset position of saddle 32 relative to the seatpost 104 (and seat tube 20). In one embodiment, one or both of the clamp retaining members are threaded bolts as shown in FIG. 1B. Although two threaded bolts are shown as clamp retaining members, it should be appreciated that the example shown in FIG. 1B is provided as one embodiment for purposes of clarity. In one embodiment, one or both of the bolts could be inverted. Similarly, in one embodiment, one or both of the clamp retaining members could be finger adjustable retaining members such as a wingnut, quick release, or the like. Further, in one embodiment, one of the clamp retaining members could be a latch, hasp, or the like such that it is only one of the retaining members that is an adjustable fastener.

In one embodiment, seatpost 104 and housing 102 are formed as a single component. In another embodiment, seatpost 104 and housing 102 consist of two or more distinct and/or different components. Further, one or more of the different components of saddle clamp system 100 can be formed from the same materials, from two or more distinct materials, etc. The materials include a group of materials such as, but not limited to, a metal, a composite, a combination of both metal and composite parts within each part, and the like. The metal options include, but are not limited to, steel, aluminum, titanium, and the like. The composite materials include carbon based composites, plastics, amalgamation (e.g., carbon/metal mix, or the like), and the like.

For example, in one embodiment, housing 102, seatpost 104, and saddle rail clamping members 108 could be made from the same material. In one embodiment, housing 102, seatpost 104, and saddle rail clamping members 108 could be made from two or more different materials. Similarly, one or more of the different saddle clamp system 100 components could include an amalgamation. For example, housing 102 consist of a carbon body with metal inserts for retaining the clamp retaining members, etc.

Positive Offset and Zero Offset

Figure 2A:
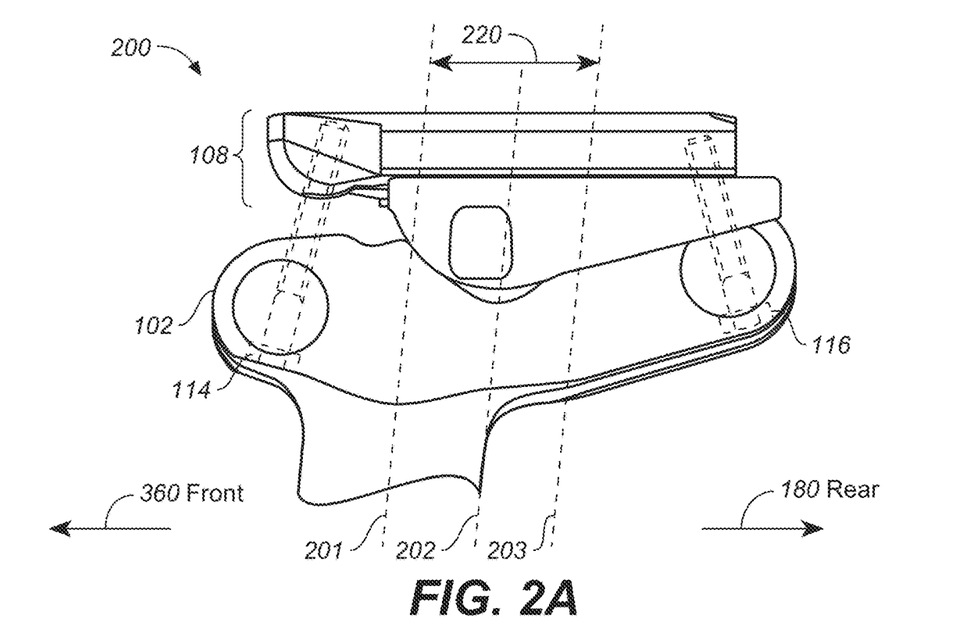
FIG. 2A is a side view of a seatpost assembly with the reversible saddle clamp in a first orientation having a first offset, in accordance with an embodiment.
Figure 2B:
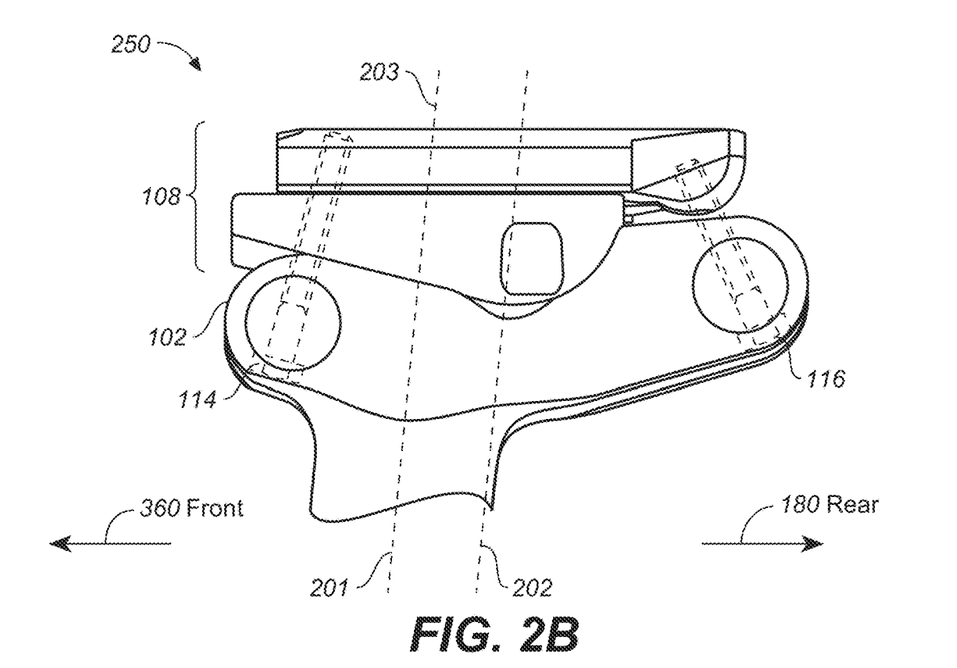
FIG. 2B is a side view of the seatpost assembly of FIG. 2A with the reversible saddle clamp in a second orientation, in accordance with an embodiment.

Referring now to FIGS. 2A and 2B, a side view of a saddle clamp system 200 and 250 respectively, is shown. Unless otherwise provided, in one embodiment the components of FIGS. 2A and 2B are similar to that shown in FIG. 1B and incorporate the discussion of FIG. 1B by reference in its entirety. FIG. 2A includes a central axis 201, a center of clamp interface with seatpost axis 202, and a clamp center axis 203. In general, central axis 201 indicates the center of the seatpost 104 (and thus the center of seat tube 20 of FIG. 1B), center of clamp interface with seatpost axis 202 is indicative of the center of the saddle rail clamping members 108, and clamp center axis 203 is indicative of the center of saddle 32 when it is clamped into saddle rail clamping members 108.

The difference between the central axis 201 and the clamp center axis 203 is offset 220. Thus, in FIG. 2A, the saddle rail clamping members 108 are in a rearward (or positive) offset orientation. That is, the center of saddle 32 when clamped into saddle rail clamping members 108 would be offset in the rear 180 direction by the distance designated as offset 220.

FIG. 2B includes central axis 201, center of clamp interface with seatpost axis 202, and clamp center axis 203. In FIG. 2B, saddle rail clamping members 108 are reversed with respect to housing 102 from the orientation shown in FIG. 2A. In one embodiment, the reversal of saddle rail clamping members 108 is performed by loosening (removing, disconnecting, etc.) first clamp retaining member 114 and/or second clamp retaining member 116 such that saddle rail clamping members 108 can be decoupled from housing 102. Once saddle rail clamping members 108 is decoupled from housing 102 it is rotated 180 degrees (about the center of clamp interface with seatpost axis 202). After the rotation, saddle rail clamping members 108 is then recoupled to housing 102 and first clamp retaining member 114 and/or second clamp retaining member 116 are then tightened and adjusted such that saddle rail clamping members 108 is fixedly coupled to housing 102.

In one embodiment, the pitch of saddle 32 is also adjusted during the tightening of first clamp retaining member 114 and/or second clamp retaining member 116.

By reversing the orientation of saddle rail clamping members 108 with respect to housing 102, the offset 220 (of FIG. 2A) is basically eliminated. That is, the center of clamp interface with seatpost axis 202 remains the same while the clamp center axis 203 is now aligned with central axis 201. Therefore, since there is no difference between the central axis 201 and the clamp center axis 203, there is no offset.

Thus, in combination, FIGS. 2A and 2B illustrate a saddle clamp system that provides two distinctly different locations for the center of saddle 32 depending upon the front/back orientation of saddle rail clamping members 108 as it is fixedly coupled to housing 102 via first clamp retaining member 114 and/or second clamp retaining member 116. In a first direction configuration, saddle rail clamping members 108 provide an offset 220. In the opposite direction configuration, saddle rail clamping members 108 align the clamp center axis 203 with central axis 201.

Figure 3A:
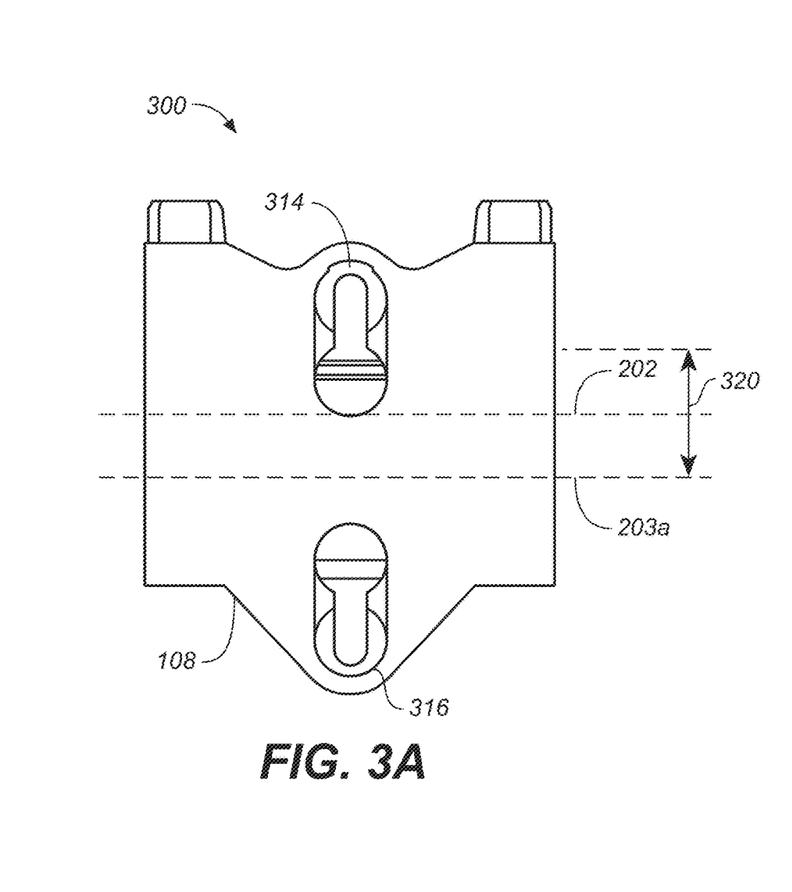
FIG. 3A is a top view of a reversible saddle clamp of FIG. 2A in a first orientation, in accordance with an embodiment.
Figure 3B:
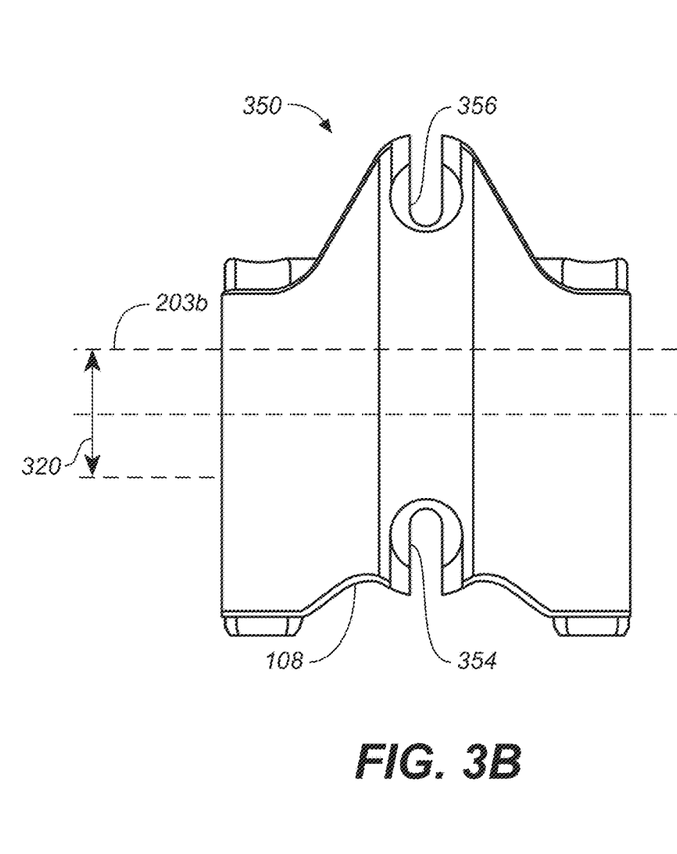
FIG. 3B is a top view of a reversible saddle clamp of FIG. 2A in a second orientation, in accordance with an embodiment.

With reference now to FIGS. 3A and 3B, top (or bottom) views 300 and 350 respectively of saddle rail clamping members 108 are shown. In FIG. 3A, retaining holes 314 and 316 for receiving first clamp retaining member 114 and second clamp retaining member 116 are shown. In one embodiment, the retaining holes 314 and 316 would allow the first clamp retaining member 114 and/or second clamp retaining member 116 (of FIGS. 1B, 2A, and 2B) to be loosened but not removed from housing 102 while allowing the saddle rail clamping members 108 to be coupled to (or removed from) housing 102.

For example, to couple saddle rail clamping members 108 with housing 102, first clamp retaining member 114 and/or second clamp retaining member 116 would be loosened and would be inserted through the wide opening in retaining holes 314 and 316. Once inserted, saddle rail clamping members 108 would be moved such that first clamp retaining member 114 and second clamp retaining member 116 would now be aligned with the smaller opening in retaining holes 314 and 316. Once properly aligned, first clamp retaining member 114 and/or second clamp retaining member 116 would be tightened such that the pitch of saddle 32 was properly oriented and the fore-aft location of saddle 32 would be fixed relative to the seatpost 104 (and seat tube 20).

In contrast, in FIG. 3B, retaining holes 314 and 316 for receiving first clamp retaining member 114 and second clamp retaining member 116 are shown having an opening therein such that the first clamp retaining member 114 and/or second clamp retaining member 116 (of FIGS. 1B, 2A, and 2B) could be loosened but not removed from housing 102 while allowing the saddle rail clamping members 108 to be coupled to (or removed from) housing 102.

For example, to couple saddle rail clamping members 108 with housing 102, first clamp retaining member 114 and/or second clamp retaining member 116 would be loosened and would be slid through the mouth opening in retaining holes 354 and 356. Saddle rail clamping members 108 would be moved with respect to first clamp retaining member 114 and second clamp retaining member 116 until the clamp retaining members were aligned with the indentations in retaining holes 354 and 356. Once properly aligned, first clamp retaining member 114 and/or second clamp retaining member 116 would be tightened such that the pitch of saddle 32 was properly oriented and the fore-aft location of saddle 32 would be fixed relative to the seatpost 104 (and seat tube 20). Although two different retaining hole designs are shown, it should be appreciated that the retaining holes could also be simple holes that would require the insertion of first clamp retaining member 114 and/or second clamp retaining member 116 therethrough, could be two different retaining hole designs, or the like. Thus, the use of the two different retaining hole designs is provided as two of many possible embodiments and shown herein for purposes of clarity.

In FIGS. 3A and 3B, the orientation of saddle rail clamping members 108 is shown in a first direction (300) and a second opposite direction (350). Although two different retaining hole configurations are shown, in one embodiment, retaining hole 314 is analogous to retaining hole 354 and retaining hole 316 is analogous to retaining hole 356. Thus, FIG. 3A shows saddle rail clamping members 108 oriented in a first direction and FIG. 3B shows saddle rail clamping members 108 rotated 180 degrees about the axis designated as clamp interface with seatpost axis 202.

In other words, the saddle rail clamping members 108 of FIGS. 3A and 3B are in the same top saddle rail clamping member 108t and bottom saddle rail clamping member 108b orientation (e.g., in both FIGS. 3A and 3B, the view of saddle rail clamping members 108 is looking down upon top saddle rail clamping member 108t) and are merely rotated 180 degrees.

FIGS. 3A and 3B show seatpost axis 202, a clamp center axis 203a (when saddle rail clamping members 108 are in a first direction), and clamp center axis 203b (when saddle rail clamping members 108 are in a second direction that is opposite of the first direction). By rotating saddle rail clamping members 108 from the orientation shown in 300 to the orientation shown in 350, the overall change in the offset about clamp interface with seatpost axis 202 is indicated by offset 320. Thus, in combination, FIGS. 3A and 3B illustrate a saddle clamp system that provides two distinctly different locations for the center of saddle 32 depending upon the front/back orientation of saddle rail clamping members 108.

Two Different Non-Zero Positive Offsets

Figure 4A:
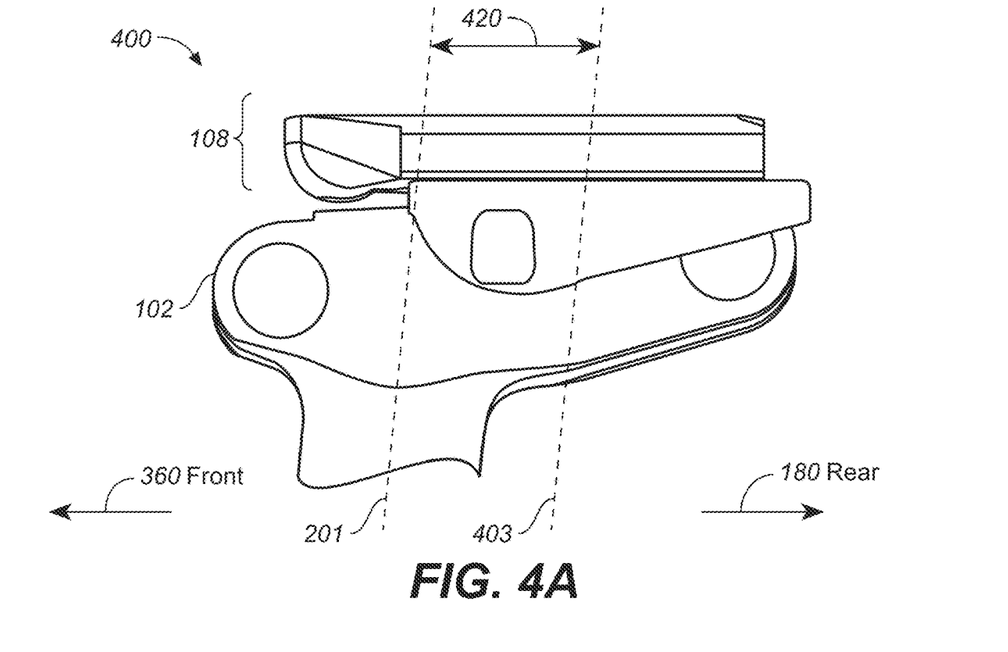
FIG. 4A is a side view of a seatpost assembly with the reversible saddle clamp in a first orientation having a first offset, in accordance with an embodiment.
Figure 4B:
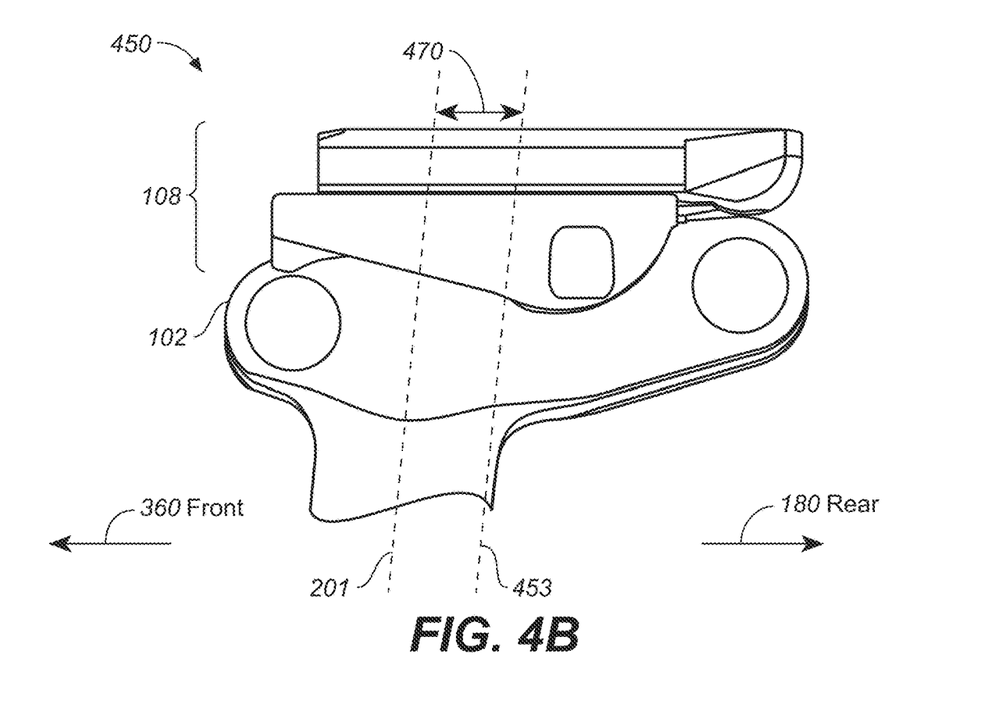
FIG. 4B is a side view of the seatpost assembly of FIG. 4A with the reversible saddle clamp in a second orientation having a second offset, in accordance with an embodiment.

Referring now to FIGS. 4A and 4B, a side view of a saddle clamp system 400 and 450 respectively, is shown. Unless otherwise provided, the components of FIGS. 4A and 4B are similar to that shown in FIGS. 1B, 2A, and 2B and incorporate the corresponding discussions by reference in their entirety. FIG. 4A includes central axis 201 and a clamp center 403. In general, central axis 201 is the same as the central axis 201 of FIGS. 2A and 2B and clamp center 403 is similar to clamp center 203 (e.g., is indicative of the center of saddle 32 when it is clamped into saddle rail clamping members 108).

The difference between the central axis 201 and the clamp center 403 is offset 420. Thus, in FIG. 4A, the saddle rail clamping members 108 are in a rearward (or positive) offset orientation. That is, the center of saddle 32 when clamped into saddle rail clamping members 108 would be offset in the rear 180 direction by the distance designated as offset 420.

FIG. 4B includes central axis 201 and clamp center 453. In FIG. 4B, saddle rail clamping members 108 are reversed with respect to housing 102 from the orientation shown in FIG. 4A. In one embodiment, the reversal of saddle rail clamping members 108 is performed in a similar manner to that discussed in FIGS. 2A and 2B and the pitch of saddle 32 is also adjusted during the tightening of first clamp retaining member 114 and/or second clamp retaining member 116.

In one embodiment, reversing the orientation of saddle rail clamping members 108 with respect to housing 102 will change the offset into a smaller rearward (or positive) offset 470. That is, the clamp center 453 is still behind central axis 201 such that the center of saddle 32, when clamped into saddle rail clamping members 108, would remain offset in the rear 180 direction, but the offset would be reduced to the new distance designated as offset 470.

Thus, in combination, FIGS. 4A and 4B illustrate a saddle clamp system that provides two distinctly different locations for the center of saddle 32 depending upon the front/back orientation of saddle rail clamping members 108 as it is fixedly coupled to housing 102 via first clamp retaining member 114 and/or second clamp retaining member 116. In a first direction configuration, saddle rail clamping members 108 provide a first rearward (or positive) offset 420. In the opposite direction configuration, saddle rail clamping members 108 provide a second (smaller) rearward (or positive) offset 470.

Negative Offset and Zero Offset

Figure 5A:
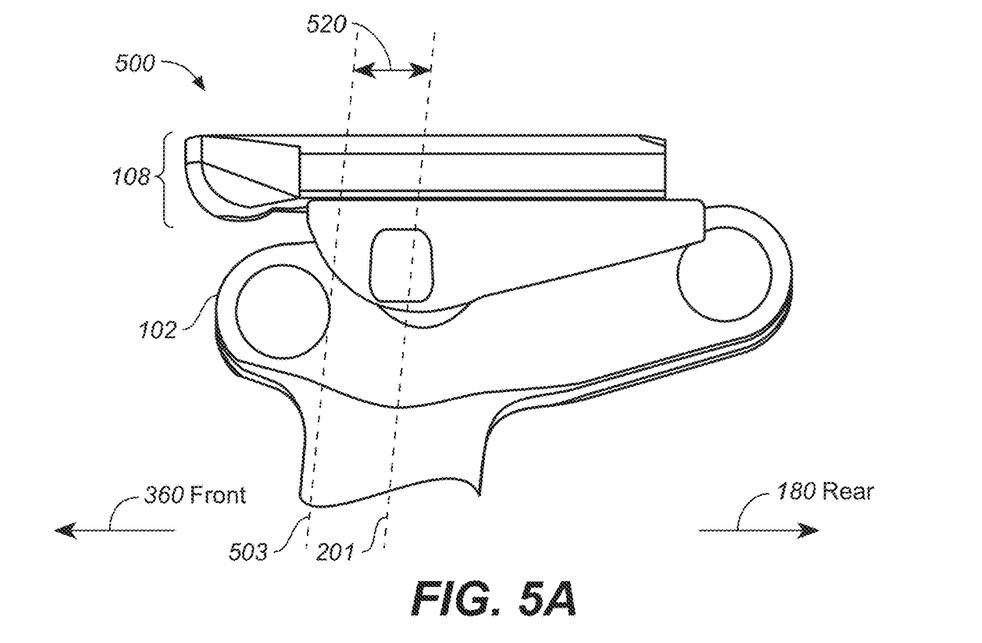
FIG. 5A is a side view of a seatpost assembly with the reversible saddle clamp in a first orientation having a first offset, in accordance with an embodiment.
Figure 5B:
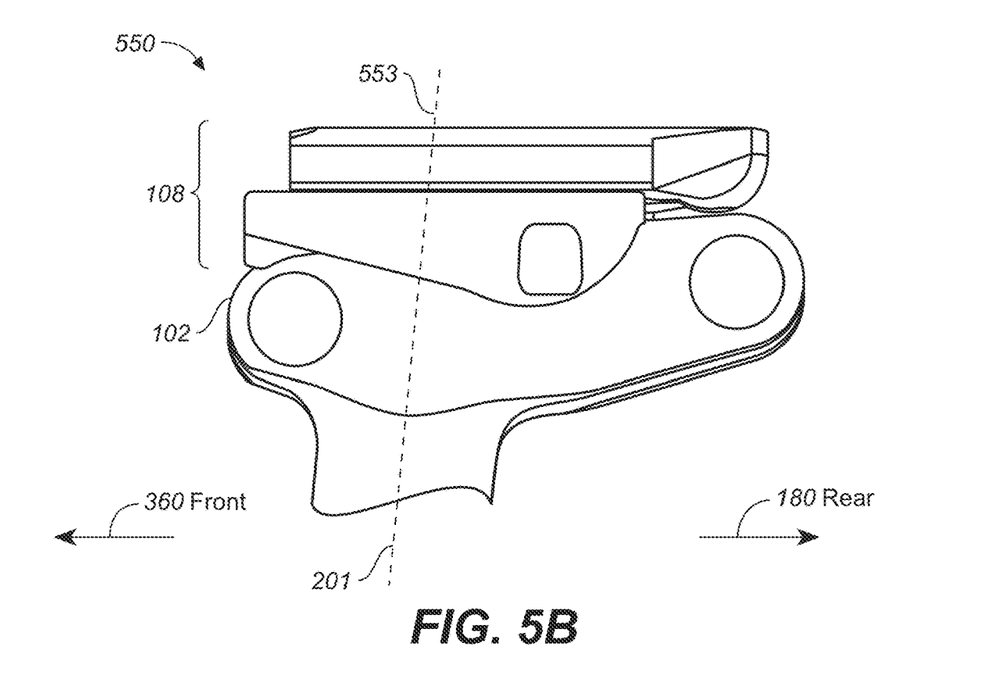
FIG. 5B is a side view of the seatpost assembly of FIG. 5A with the reversible saddle clamp in a second orientation, in accordance with an embodiment.

Referring now to FIGS. 5A and 5B, a side view of a saddle clamp system 500 and 550 respectively, is shown. Unless otherwise provided, the components of FIGS. 5A and 5B are similar to that shown in FIGS. 1B, 2A, and 2B and incorporate the corresponding discussions by reference in their entirety. FIG. 5A includes a central axis 201 and a clamp center 503. In general, central axis 201 is the same as the central axis 201 of FIGS. 2A and 2B and clamp center 503 is similar to clamp center 203 (e.g., is indicative of the center of saddle 32 when it is clamped into saddle rail clamping members 108).

The difference between the central axis 201 and the clamp center 503 is offset 520. Thus, in FIG. 5A, the saddle rail clamping members 108 are in a forward (or negative) offset orientation. That is, the center of saddle 32 when clamped into saddle rail clamping members 108 would be offset in the front 360 direction by the distance designated as offset 520.

FIG. 5B includes central axis 201 and clamp center 553. In FIG. 5B, saddle rail clamping members 108 are reversed with respect to housing 102 from the orientation shown in FIG. 5A. In one embodiment, the reversal of saddle rail clamping members 108 is performed in a similar manner to that discussed in FIGS. 2A and 2B and the pitch of saddle 32 is also adjusted during the tightening of first clamp retaining member 114 and/or second clamp retaining member 116.

In one embodiment, reversing the orientation of saddle rail clamping members 108 with respect to housing 102 will remove the offset such that central axis 201 and clamp center 553 are approximately aligned. That is, the clamp center 553 is now the same as central axis 201 such that the center of saddle 32, when clamped into saddle rail clamping members 108, is not offset.

Thus, in combination, FIGS. 5A and 5B illustrate a saddle clamp system that provides two distinctly different locations for the center of saddle 32 depending upon the front/back orientation of saddle rail clamping members 108 as it is fixedly coupled to housing 102 via first clamp retaining member 114 and/or second clamp retaining member 116. In a first direction configuration, saddle rail clamping members 108 provide the forward (or negative) offset 520. In the opposite direction configuration, saddle rail clamping members 108 provide a zero offset (e.g., central axis 201 and clamp center 553 are approximately aligned).

Two Different Negative Offsets

Figure 6A:
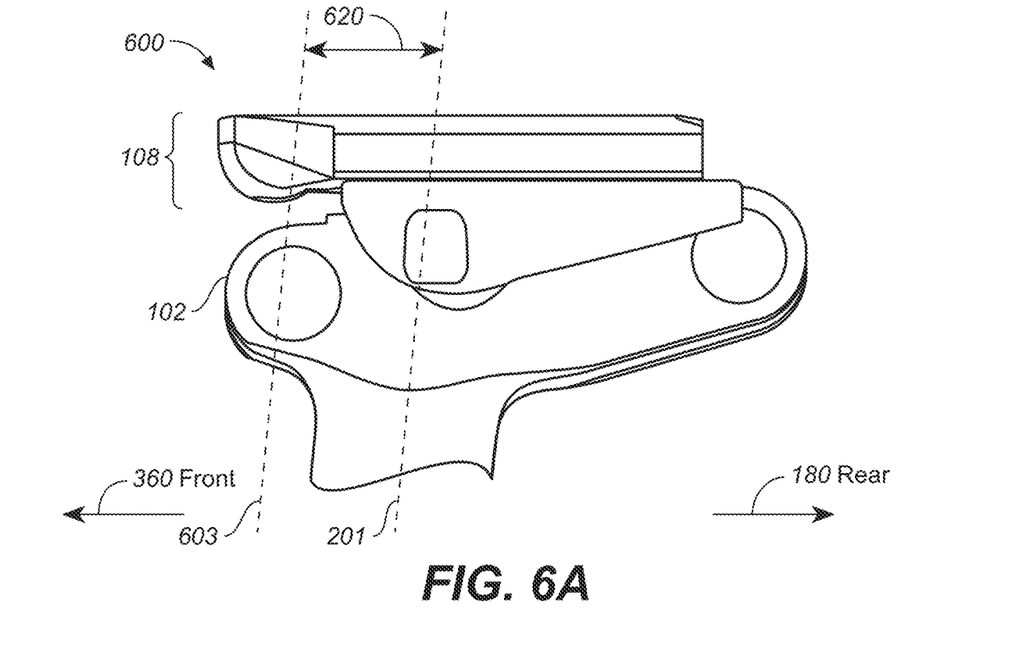
FIG. 6A is a side view of a seatpost assembly with the reversible saddle clamp in a first orientation having a first offset, in accordance with an embodiment.
Figure 6B:
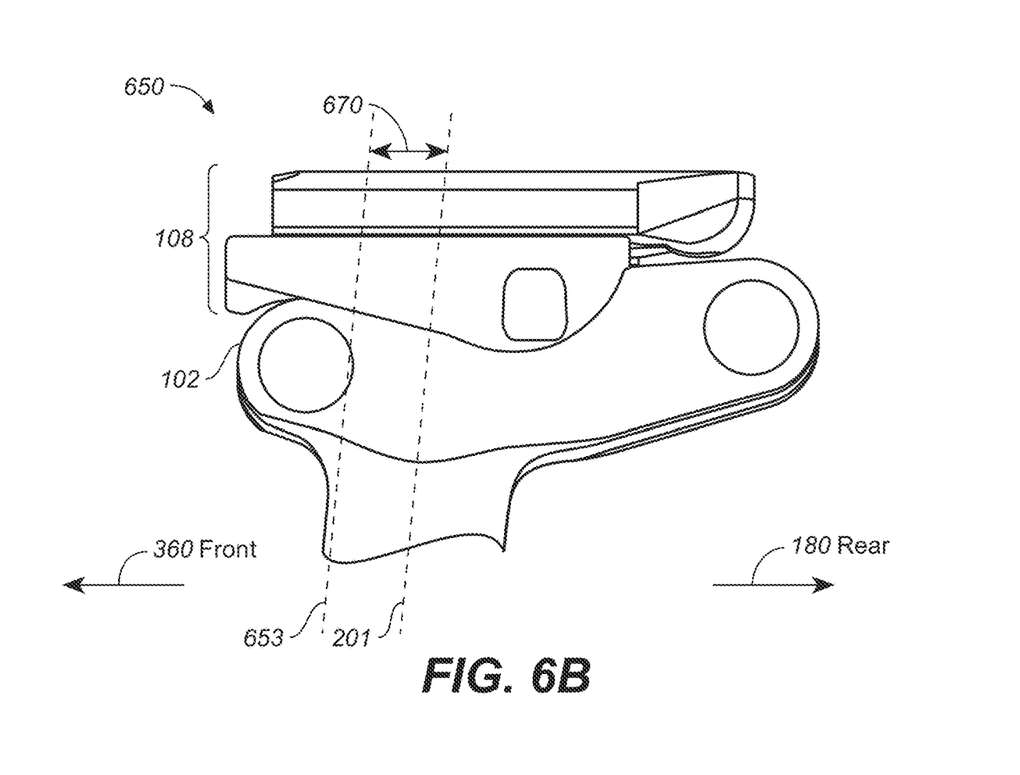
FIG. 6B is a side view of the seatpost assembly of FIG. 6A with the reversible saddle clamp in a second orientation having a second offset, in accordance with an embodiment.

Referring now to FIGS. 6A and 6B, a side view of a saddle clamp system 600 and 650 respectively, is shown. Unless otherwise provided, the components of FIGS. 6A and 6B are similar to that shown in FIGS. 1B, 2A, and 2B and incorporate the corresponding discussions by reference in their entirety. FIG. 6A includes a central axis 201 and a clamp center 603. In general, central axis 201 the same as the central axis 201 of FIGS. 2A and 2B and clamp center 603 is similar to clamp center 203 (e.g., is indicative of the center of saddle 32 when it is clamped into saddle rail clamping members 108).

The difference between the central axis 201 and the clamp center 603 is offset 620. Thus, in FIG. 6A, the saddle rail clamping members 108 are in a forward (or negative) offset orientation. That is, the center of saddle 32 when clamped into saddle rail clamping members 108 would be offset in the front 360 direction by the distance designated as offset 620.

FIG. 6B includes central axis 201 and clamp center 653. In FIG. 6B, saddle rail clamping members 108 are reversed with respect to housing 102 from the orientation shown in FIG. 6A. In one embodiment, the reversal of saddle rail clamping members 108 is performed in a similar manner to that discussed in FIGS. 2A and 2B and the pitch of saddle 32 is also adjusted during the tightening of first clamp retaining member 114 and/or second clamp retaining member 116.

In one embodiment, reversing the orientation of saddle rail clamping members 108 with respect to housing 102 will change the offset into a smaller forward (or negative) offset 670. That is, the clamp center 653 remains in front of central axis 201 (but at a smaller offset distance) such that the center of saddle 32, when clamped into saddle rail clamping members 108, is offset (to a lesser extent) in the forward 360 direction by the distance designated as offset 670.

Thus, in combination, FIGS. 6A and 6B illustrate a saddle clamp system that provides two distinctly different locations for the center of saddle 32 depending upon the front/back orientation of saddle rail clamping members 108 as it is fixedly coupled to housing 102 via first clamp retaining member 114 and/or second clamp retaining member 116. In a first direction configuration, saddle rail clamping members 108 provide the forward (or negative) offset 620. In the opposite direction configuration, saddle rail clamping members 108 provide a smaller forward (or negative) offset 670.

Positive Offset and Negative Offset

Figure 7A:
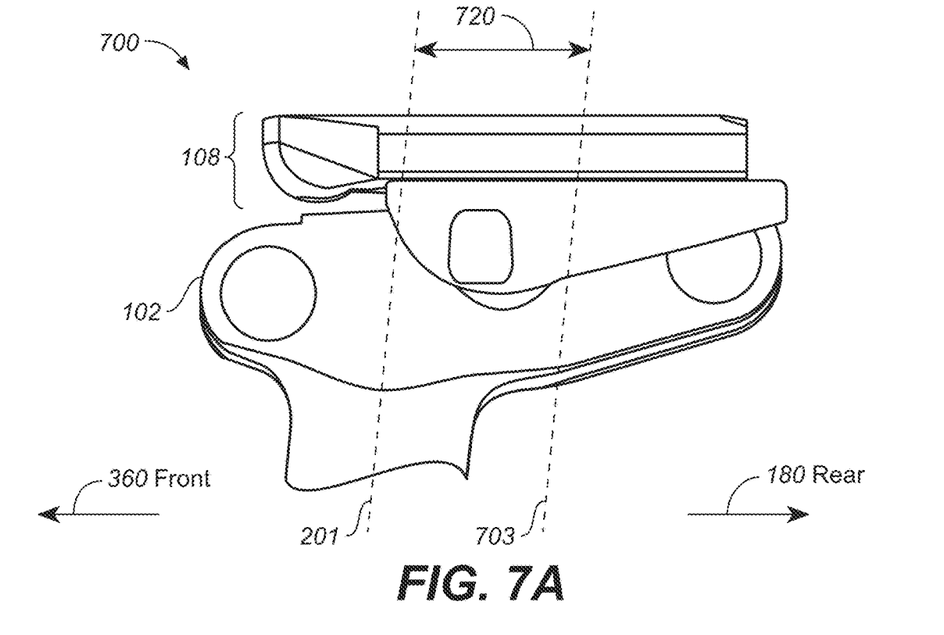
FIG. 7A is a side view of a seatpost assembly with the reversible saddle clamp in a first orientation having a first offset, in accordance with an embodiment.
Figure 7B:
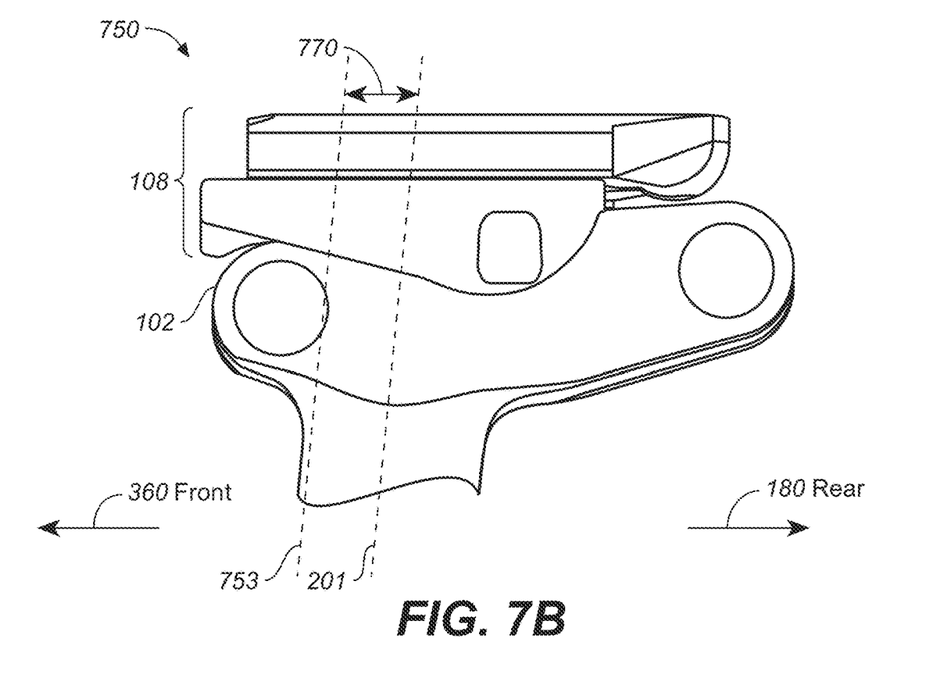
FIG. 7B is a side view of the seatpost assembly of FIG. 7A with the reversible saddle clamp in a second orientation having a second offset, in accordance with an embodiment.

Referring now to FIGS. 7A and 7B, a side view of a saddle clamp system 700 and 750 respectively, is shown. Unless otherwise provided, the components of FIGS. 7A and 7B are similar to that shown in FIGS. 1B, 2A, and 2B and incorporate the corresponding discussions by reference in their entirety. FIG. 7A includes a central axis 201 and a clamp center 703. In general, central axis 201 is the same as the central axis 201 of FIGS. 2A and 2B and clamp center 703 is similar to clamp center 203 (e.g., is indicative of the center of saddle 32 when it is clamped into saddle rail clamping members 108).

The difference between the central axis 201 and the clamp center 703 is offset 720. Thus, in FIG. 7A, the saddle rail clamping members 108 are in a rearward (or positive) offset orientation. That is, the center of saddle 32 when clamped into saddle rail clamping members 108 would be offset in the rear 180 direction by the distance designated as offset 720.

FIG. 7B includes central axis 201 and clamp center 753. In FIG. 7B, saddle rail clamping members 108 are reversed with respect to housing 102 from the orientation shown in FIG. 7A. In one embodiment, the reversal of saddle rail clamping members 108 is performed in a similar manner to that discussed in FIGS. 2A and 2B and the pitch of saddle 32 is also adjusted during the tightening of first clamp retaining member 114 and/or second clamp retaining member 116.

In one embodiment, reversing the orientation of saddle rail clamping members 108 with respect to housing 102 will change the offset into a forward (or negative) offset 770. That is, the clamp center 753 is now in front of central axis 201 such that the center of saddle 32, when clamped into saddle rail clamping members 108, is offset in the forward 360 direction by the distance designated as offset 770.

Thus, in combination, FIGS. 7A and 7B illustrate a saddle clamp system that provides two distinctly different locations for the center of saddle 32 depending upon the front/back orientation of saddle rail clamping members 108 as it is fixedly coupled to housing 102 via first clamp retaining member 114 and/or second clamp retaining member 116. In a first direction configuration, saddle rail clamping members 108 provide the rearward (or positive) offset 720. In the opposite direction configuration, saddle rail clamping members 108 provide the forward (or negative) offset 770.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A seatpost assembly comprising:
   a housing fixedly coupled to a seatpost, the housing comprising:
   at least one adjustable clamp assembly retaining member; and
   a reversable saddle rail clamp assembly, the reversable saddle rail clamping assembly comprising:
   a bottom saddle rail clamping member; and
   a top saddle rail clamping member,
      wherein the top saddle rail clamping member is configured to be coupled with the bottom saddle rail clamping member in a first orientation to provide a first offset position, and
      wherein the top saddle rail clamping member is further configured to be coupled with the bottom saddle rail clamping member in a second orientation to provide a second offset position; and
   the housing further comprising:
      at least one positionally fixed clamp assembly retaining member configured to be used in conjunction with the at least one adjustable clamp assembly retaining member to provide a clamping force for the reversable saddle rail clamp assembly, wherein an adjustment to the at least one adjustable clamp assembly retaining member is configured to adjust a pitch of the reversable saddle rail clamp assembly and provide support against a pitch slip of the reversable saddle rail clamp assembly.

2. The seatpost assembly of claim 1, wherein the seatpost is configured to be retained by a seat tube of a vehicle.

3. The seatpost assembly of claim 1, wherein said bottom saddle rail clamping member is sandwiched between said housing and said top saddle rail clamping member.

4. The seatpost assembly of claim 1, wherein said at least one adjustable clamp assembly retaining member is configured to be inserted through said housing and said reversable saddle rail clamp assembly in an upward orientation such that a head of said at least one adjustable clamp assembly retaining member is located at said housing.

5. The seatpost assembly of claim 1, wherein said at least one adjustable clamp assembly retaining member is configured to be inserted through said reversable saddle rail clamp assembly and said housing in a downward orientation such that a head of said at least one adjustable clamp assembly retaining member is located at said reversable saddle rail clamp assembly.

6. The seatpost assembly of claim 1, wherein an adjustment to the at least one adjustable clamp assembly retaining member is configured to modify said clamping force for said reversable saddle rail clamp assembly.

7. The seatpost assembly of claim 1, wherein the housing further comprises:
a second adjustable clamp assembly retaining member, wherein said second adjustable clamp assembly retaining member is configured to be used in conjunction with said at least one adjustable clamp assembly retaining member to provide a clamping force for said reversable saddle rail clamp assembly.

8. The seatpost assembly of claim 7, wherein an adjustment to one or both of said second adjustable clamp assembly retaining member and said at least one adjustable clamp assembly retaining member is configured to modify said clamping force for said reversable saddle rail clamp assembly.

9. The seatpost assembly of claim 7, wherein an adjustment to one or both of said second adjustable clamp assembly retaining member and said at least one adjustable clamp assembly retaining member is configured to adjust a pitch of said reversable saddle rail clamp assembly and provide support against a pitch slip of said reversable saddle rail clamp assembly.

10. The seatpost assembly of claim 1, wherein the reversable saddle rail clamp assembly is configured to fixedly retain a set of saddle rails of a saddle.

11. The seatpost assembly of claim 1, wherein the housing and the seatpost are a single piece.

12. The seatpost assembly of claim 1, wherein said at least one adjustable clamp assembly retaining member is a threaded bolt.

13. The seatpost assembly of claim 1, wherein said at least one adjustable clamp assembly retaining member is a finger adjustable fastener.

14. A seatpost assembly comprising:
a seatpost;
a housing fixedly coupled to the seatpost, the housing comprising:
at least one adjustable clamp assembly retaining member; and
a reversable saddle rail clamp assembly configured to fixedly retain a set of saddle rails of a saddle, the reversable saddle rail clamping assembly comprising:
a bottom saddle rail clamping member; and
a top saddle rail clamping member,
wherein said bottom saddle rail clamping member is sandwiched between said housing and said top saddle rail clamping member,
wherein the top saddle rail clamping member is configured to be coupled with the bottom saddle rail clamping member in a first orientation to provide a first offset position, and
wherein the top saddle rail clamping member is further configured to be coupled with the bottom saddle rail clamping member in a second orientation to provide a second offset position; and
the housing further comprising:
at least one second clamp assembly retaining member configured to be used in conjunction with the at least one adjustable clamp assembly retaining member to provide a clamping force for the reversable saddle rail clamp assembly, wherein an adjustment to the at least one adjustable clamp assembly retaining member is configured to adjust a pitch of the reversable saddle rail clamp assembly and provide support against a pitch slip of the reversable saddle rail clamp assembly.

15. The seatpost assembly of claim 14, wherein said at least one adjustable clamp assembly retaining member is configured to be inserted through said reversable saddle rail clamp assembly and said housing in a downward orientation such that a head of said at least one adjustable clamp assembly retaining member is located at said top saddle rail clamping member of said reversable saddle rail clamp assembly.

16. The seatpost assembly of claim 14, wherein
the second clamp assembly retaining member is a positionally fixed clamp assembly retaining member, wherein said at least one positionally fixed clamp assembly retaining member is configured to be used in conjunction with said at least one adjustable clamp assembly retaining member to provide a clamping force, a pitch adjustment, and a support against a pitch slip for said reversable saddle rail clamp assembly.

17. The seatpost assembly of claim 14, wherein
said second adjustable clamp assembly retaining member is configured to be used in conjunction with said at least one adjustable clamp assembly retaining member to provide a clamping force and a support against a pitch slip for said reversable saddle rail clamp assembly, and
wherein an adjustment to one or both of said second adjustable clamp assembly retaining member and said at least one adjustable clamp assembly retaining member is configured to modify said clamping force and adjust a pitch of said reversable saddle rail clamp assembly.

* * * * *

UNITED STATES PATENT AND TRADEMARK OFFICE
CERTIFICATE OF CORRECTION

| | |
|---|---|
| PATENT NO. | : 11,433,963 B2 |
| APPLICATION NO. | : 16/848083 |
| DATED | : September 6, 2022 |
| INVENTOR(S) | : Pollock et al. |

It is certified that error appears in the above-identified patent and that said Letters Patent is hereby corrected as shown below:

On the Title Page

Item (12) should read:
Pollock et al.

ADD:
(72) Inventor: Joshua Coaplen, Asheville, NC (US);

Signed and Sealed this
Sixth Day of February, 2024

Katherine Kelly Vidal
*Director of the United States Patent and Trademark Office*